United States Patent
Kothari et al.

(10) Patent No.: US 11,571,805 B1
(45) Date of Patent: Feb. 7, 2023

(54) MOBILE ROBOT-ON-RAIL, AND RELATED SYSTEMS AND METHODS

(71) Applicant: Amazon Technologies, Inc., Seattle, WA (US)

(72) Inventors: Sachin Kothari, Issaquah, PA (US); Roland Menassa, Renton, WA (US); Steven Eric Nuetzman, Syracuse, UT (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 983 days.

(21) Appl. No.: 16/242,294

(22) Filed: Jan. 8, 2019

(51) Int. Cl.
| | |
|---|---|
| *B25J 5/02* | (2006.01) |
| *B25J 9/00* | (2006.01) |
| *B25J 9/16* | (2006.01) |
| *H04W 4/021* | (2018.01) |
| *H04W 4/80* | (2018.01) |
| *B60L 53/30* | (2019.01) |

(52) U.S. Cl.
CPC .............. *B25J 5/02* (2013.01); *B25J 9/0027* (2013.01); *B25J 9/0093* (2013.01); *B25J 9/162* (2013.01); *H04W 4/021* (2013.01); *H04W 4/80* (2018.02); *B60L 53/305* (2019.02); *B60L 2200/26* (2013.01)

(58) Field of Classification Search
CPC . B25J 5/02; B25J 9/0027; B25J 9/0093; B25J 9/162; B60L 53/305; B60L 2200/26; H04W 4/021; H04W 4/80
See application file for complete search history.

(56) References Cited

U.S. PATENT DOCUMENTS

| | | | | |
|---|---|---|---|---|
| 5,009,560 | A * | 4/1991 | Ruder | B65G 67/08 198/588 |
| 10,065,798 | B2 * | 9/2018 | Borders | B65G 65/00 |
| 2003/0172834 | A1 * | 9/2003 | De-Gol | A63G 21/08 104/53 |
| 2015/0360882 | A1 * | 12/2015 | Girtman | B25J 11/00 414/796.5 |
| 2018/0272522 | A1 * | 9/2018 | Doll | B25J 5/02 |
| 2018/0319286 | A1 * | 11/2018 | Greyson | B60L 5/38 |

OTHER PUBLICATIONS

"Insulated Conductor Rail SinglePowerLine Program 0812"; www.conductix.com; Conductix Wampfler; © 2017; 34 pages.
FANUC Single Alpha 400V iS Series; specifications; No. B-65262EN/07; 28 pages.

\* cited by examiner

*Primary Examiner* — Dale Moyer
(74) *Attorney, Agent, or Firm* — BakerHostetler

(57) ABSTRACT

A robot system includes a track that extends along an axis between a first location and a second location. The track includes a pair of rails and a power transmitter and a radiating cable each extending along the track. A carriage is configured to convey a robot arm along the track. The carriage includes a plurality of wheels configured to roll along the pair of rails, a motor configured to drive at least one of the wheels along one of the rails, a power collector configured to translate along the power transmitter while maintaining contact with the power transmitter so as to conduct electrical power from the power transmitter to the motor, and a transceiver configured to receive and send electronic information from and to the radiating cable.

20 Claims, 13 Drawing Sheets

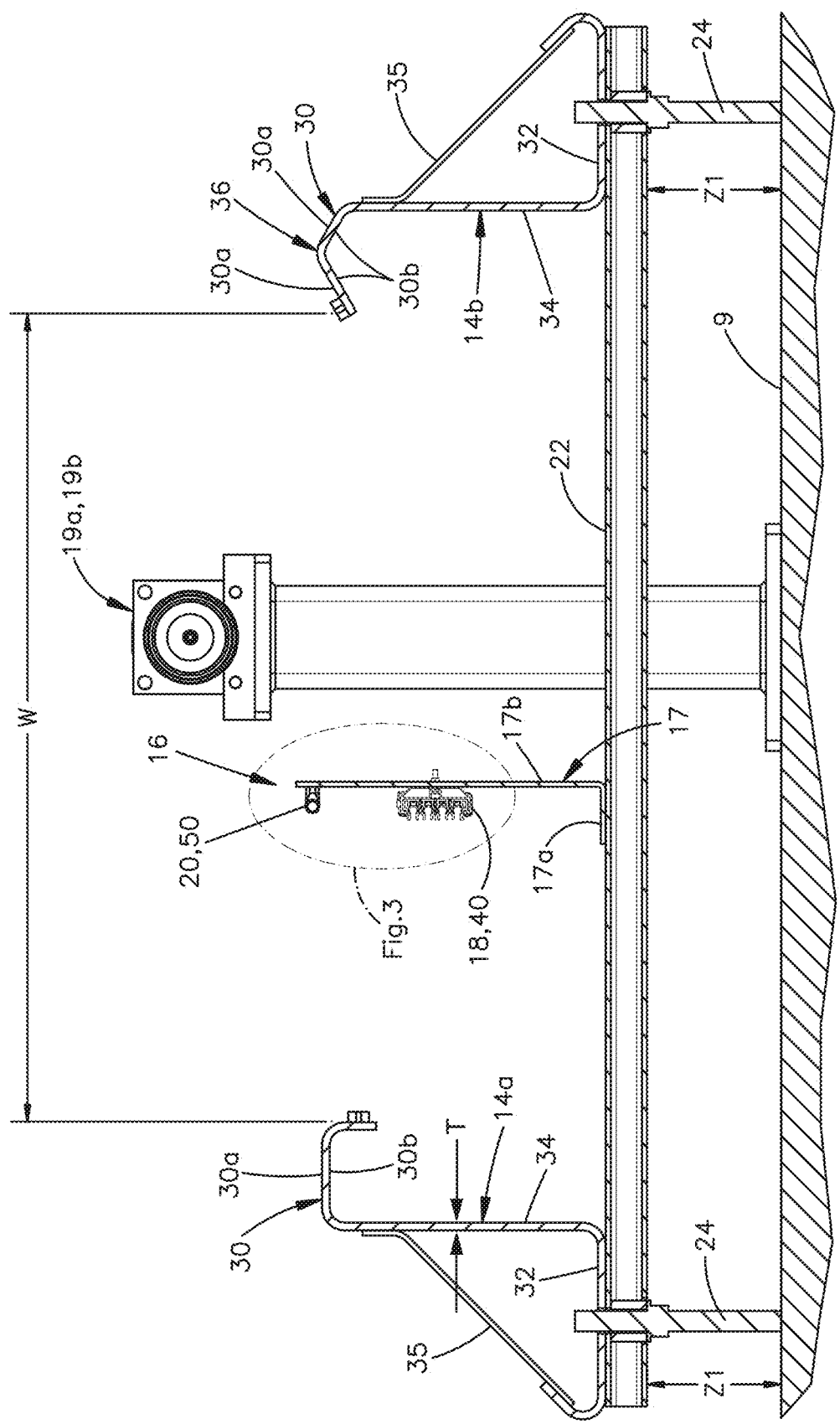

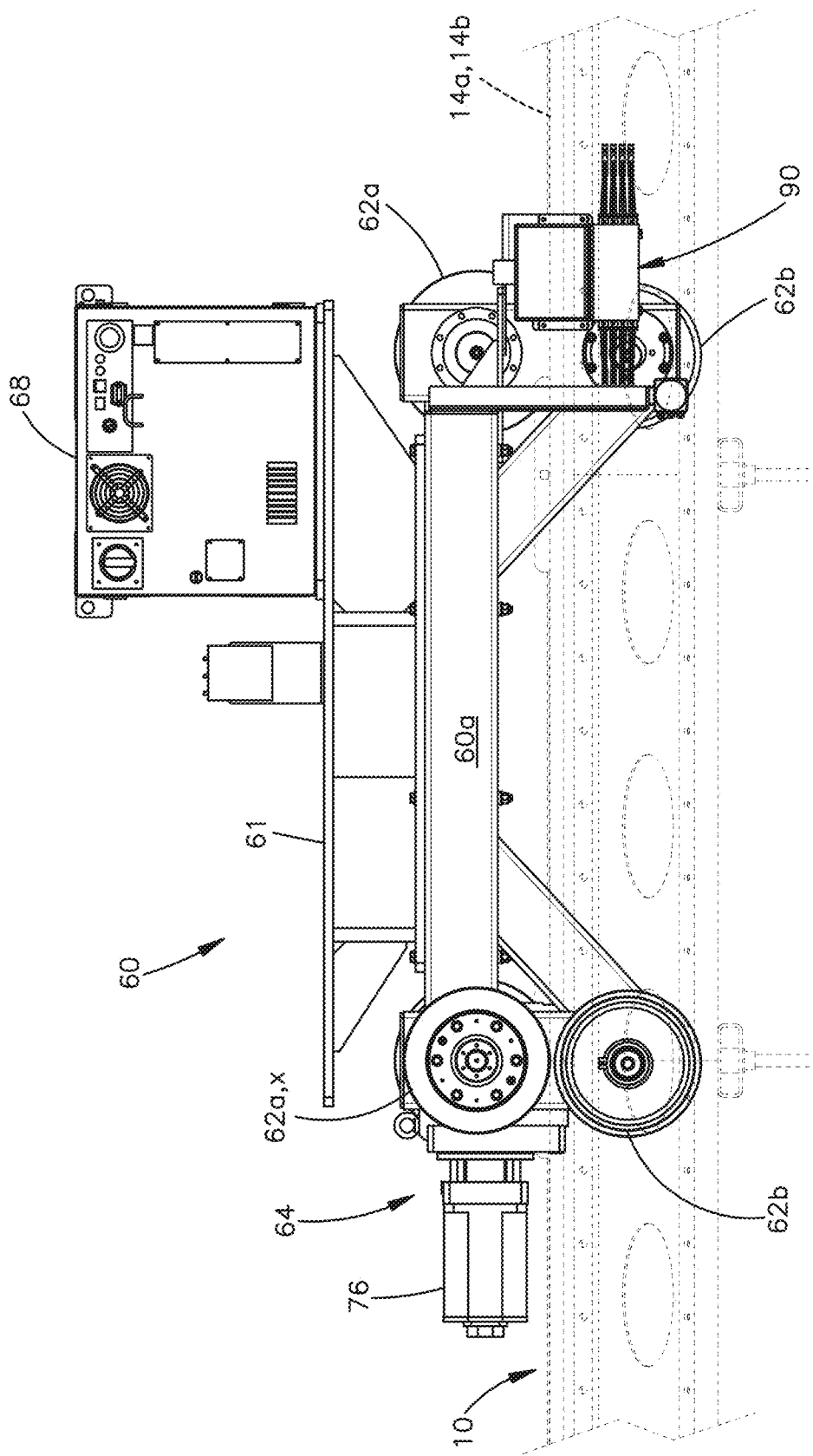

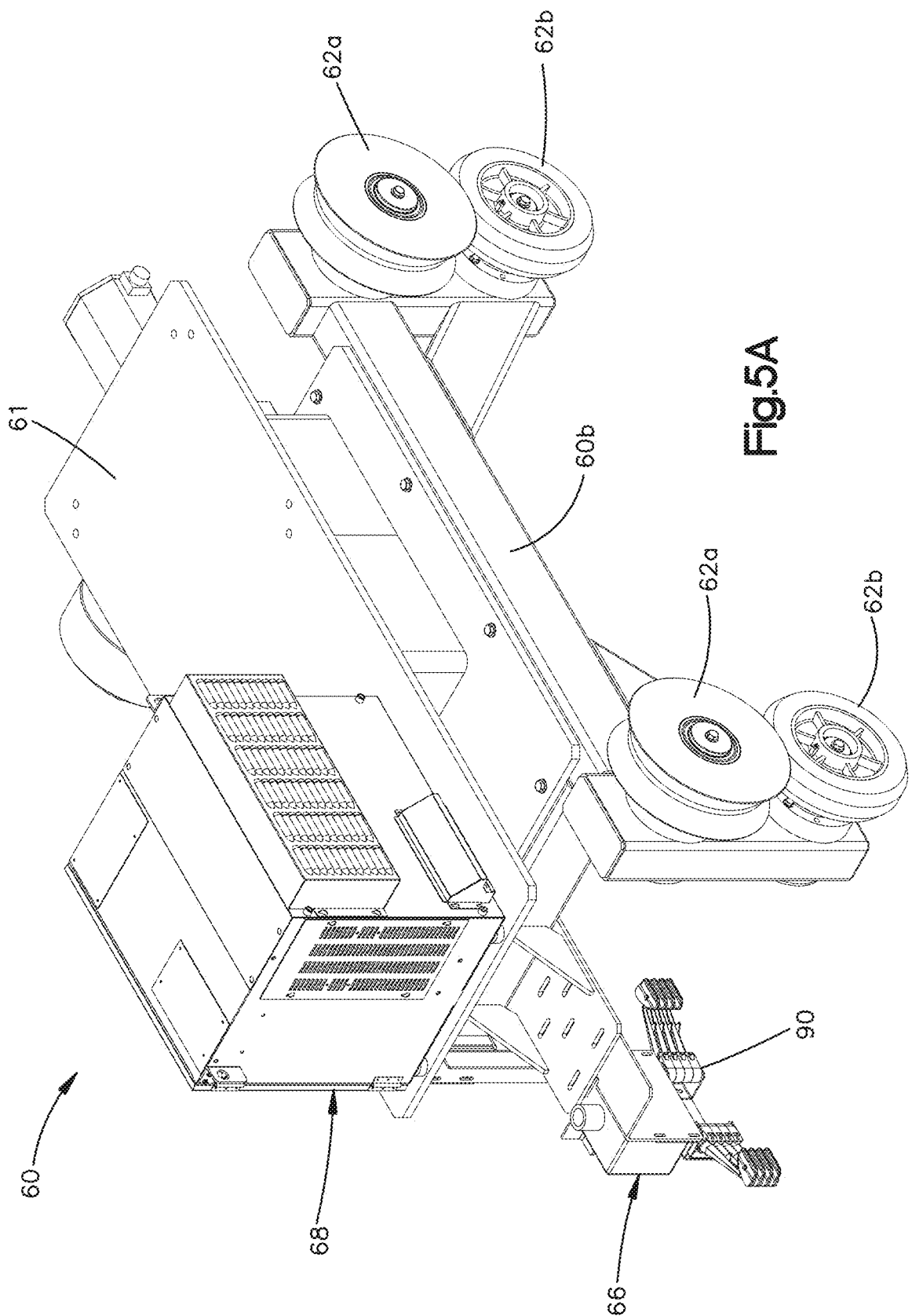

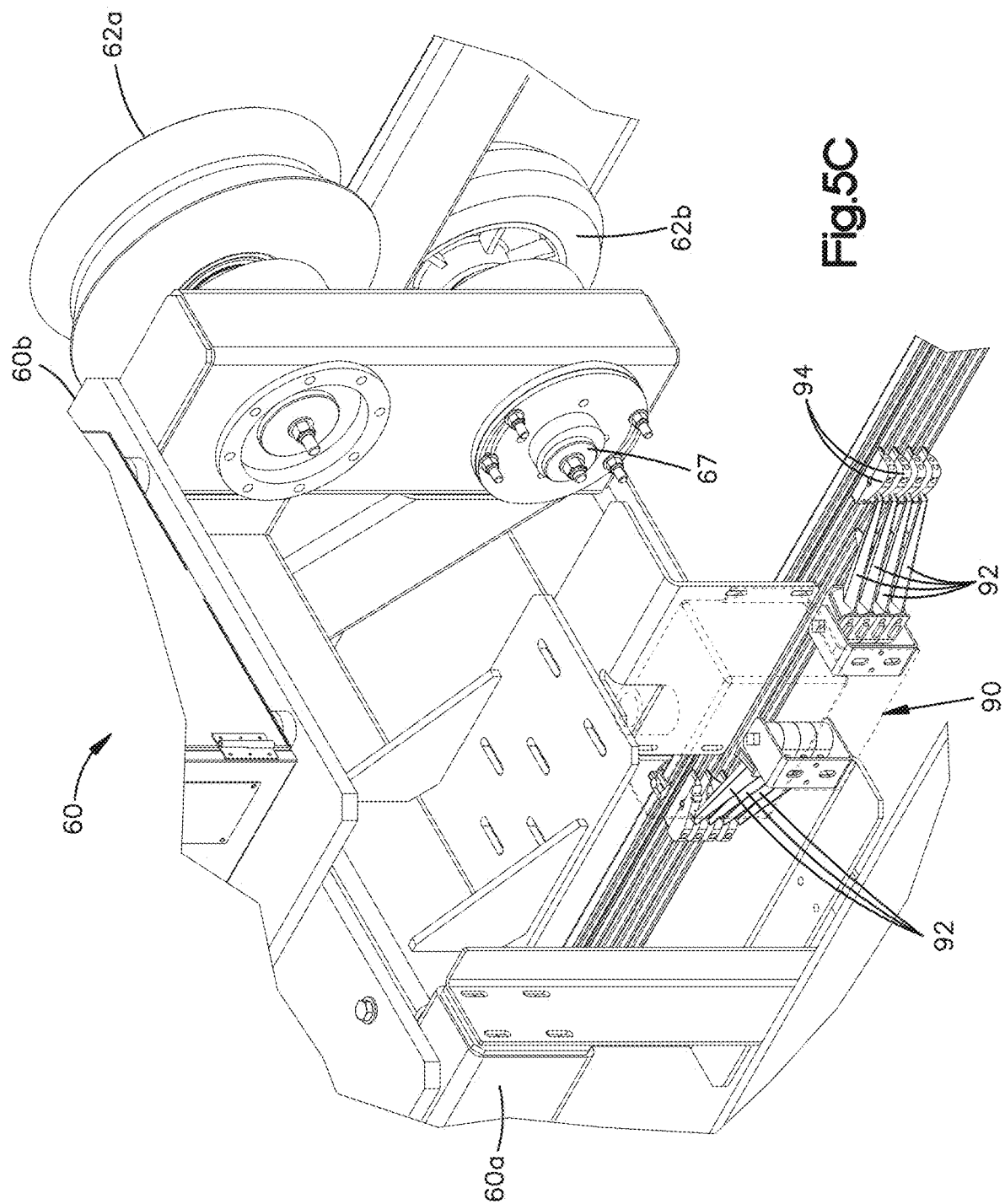

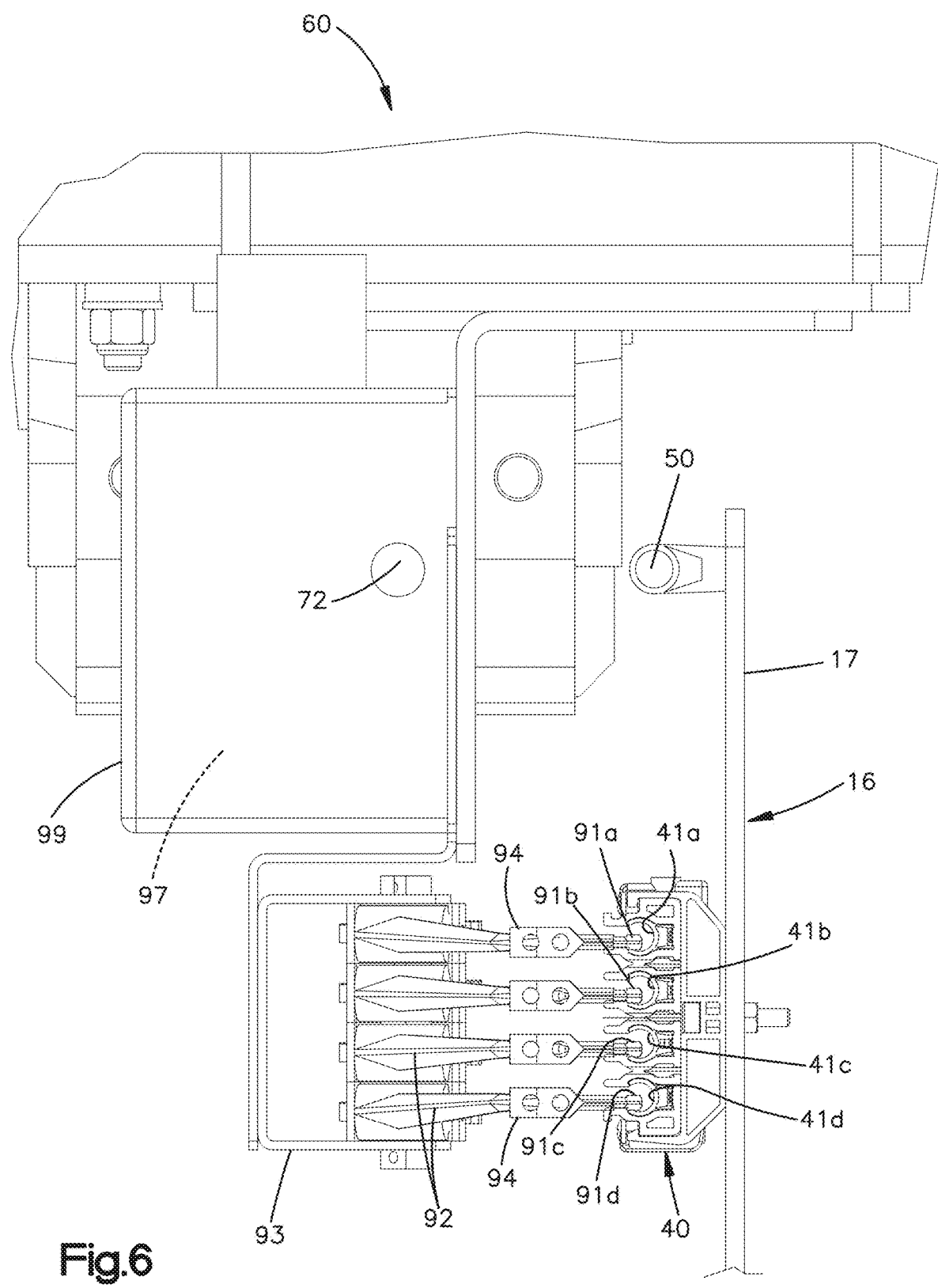

MOBILE ROBOT-ON-RAIL, AND RELATED SYSTEMS AND METHODS

BACKGROUND

The present invention relates to automation, and more particularly to systems for enhanced-motion robots.

The robotics field has developed many tools for engaging and lifting (i.e., "picking") items at the end of a robotic arm. Robotic arms are typically mounted to a static or substantially static robot station and have various sections and joints providing the arm with movement capabilities along and/or about up to six axes of movement (thus, such robotic arms are commonly referred to as a "6-axis" robot or robotic arm). While the foregoing degrees of movement allow the robotic arm to articulate its end effector as needed to pick, transport, and deposit items from a stationary picking station in a warehouse (such as an order fulfillment center), the robotic arm is limited in many ways by operating from a static robot station.

Providing the robot arm mobility along an additional axis (such as a seventh axis) would increase the robot arm's range of motion and thus its effectiveness transporting items in a warehouse.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 2C shows a sectional end view of the track illustrated in FIG. 1;

FIG. 4B is a side plan view of the carriage illustrated in FIG. 4A, displaying the first side of the carriage;

FIG. 5A shows another perspective view of the carriage illustrated in FIG. 4A, displaying a second side of the carriage opposite the first side;

FIG. 5C is another perspective view of a portion of the carriage illustrated in FIG. 5A, showing a communication device of the track, and a power coupling between a power collector of the carriage and a power transmitter of the track, according to an embodiment of the present disclosure; and FIG. 6 shows an end view of the communication device and the power coupling illustrated in FIG. 5C.

DETAILED DESCRIPTION

The embodiments of the present disclosure pertain to mobile robots that have a robot arm, such as a type configured to articulate along and/or about six axes of movement, which robots are mounted to a carriage that moves along a track, which provides the robot with movement along an additional axis, such as a seventh axis. Such mobile robots can be referred to as "robot-on-rail" units. Because these mobile robots travel between various locations along the track, they provide enhanced flexibility in sorting operations in a fulfilment center, which can provide significant increases in sorting efficiency and throughput. Additionally, the mobile robots disclosed herein are powered and controlled without the use of cables that would physically tether the robots to a fixed power source. The absence of tethering cables is expected to provide significant reductions to the maintenance time and cost of the systems that employ these mobile robots. When employed at industrial scales, such as within a network of fulfilment centers, the cost benefits provided by the increased sorting throughput and reduced maintenance costs can be substantial.

Figure 1:
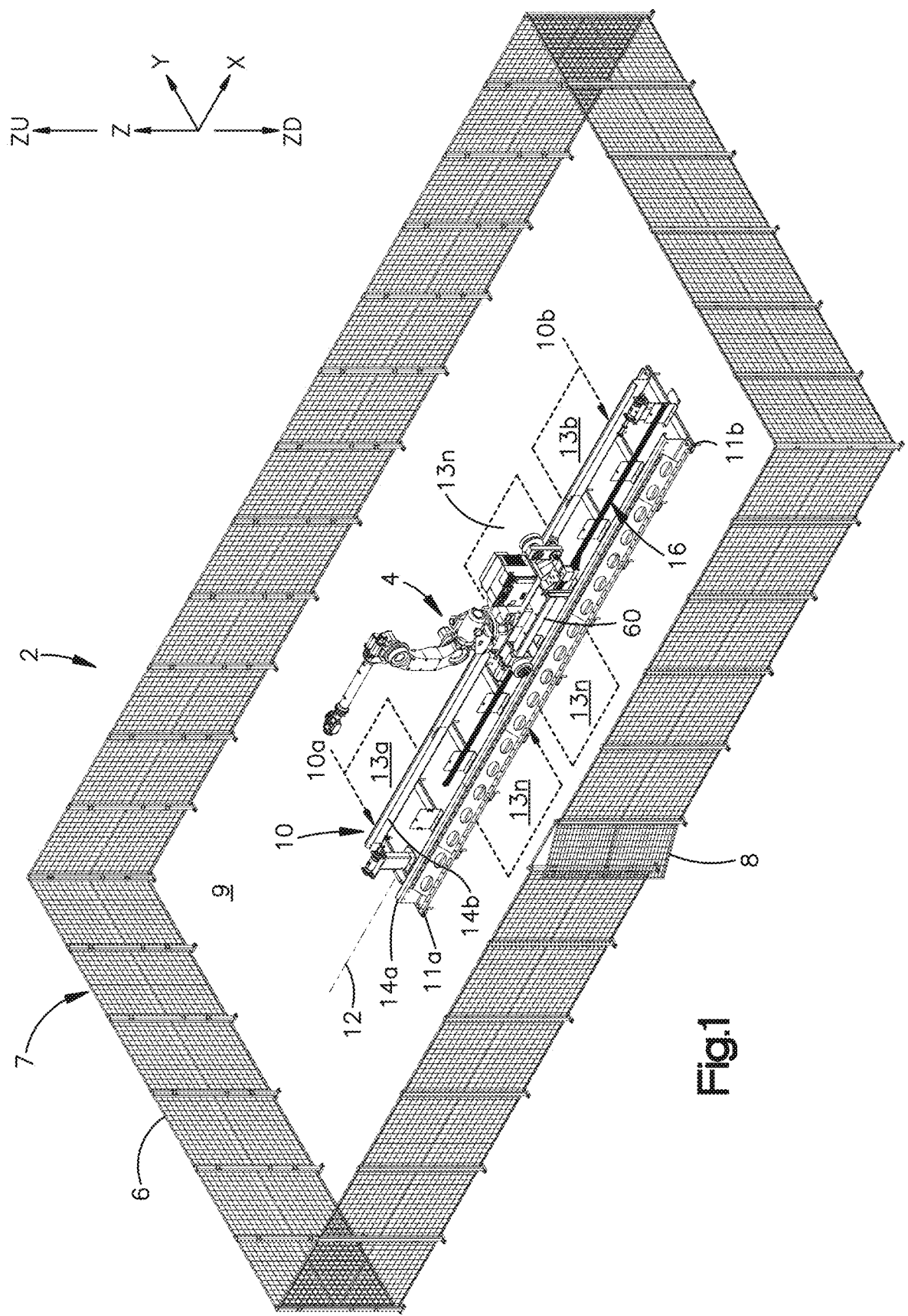
FIG. 1 shows a perspective view of a mobile robot-on-rail system, according to an example embodiment of the present disclosure.

Referring now to FIG. 1, a mobile robot system 2 includes a robot 4 mounted to a carriage 60 that is configured to travel along a track 10 between a first position 10a along the track 10 and a second position 10b along the track 10. The track 10 extends along an axis 12, which can also be referred to as an "axis of travel", between a first track end 11a and a second track end 11b opposite each other along the axis 12. The axis 12 extends along at least a first direction X, which can be a purely horizontal dimension. It should be appreciated, however, that the axis 12 can also extend along a second direction Y, such as a horizontal dimension perpendicular to the first dimension X, and/or a third direction Z, such as a vertical dimension perpendicular to the first and second dimensions X, Y. Thus, although the axis of travel 12 depicted in the Figures extends linearly along a single horizontal direction, it should be appreciated that the axis 12 can extend along one, two, or three dimensions as desired. In the embodiments illustrated herein, the first and second directions X, Y are horizontal directions, while the third direction Z is a vertical direction, although other respective orientations are within the scope of the present disclosure. It is to be appreciated that when the third direction is the vertical direction Z, the vertical direction Z is bi-directional, and has constituent mono-direction components including the downward vertical direction ZD and the opposite, upward vertical direction ZU.

The first and second positions 10a, 10b along the track 10 are preferably intermediate the first and second track ends 11a, 11b, such that the first position 10a is spaced from the first track end 11a, and the second position 10b is spaced from the second track end 11b. The system 2 includes a first staging region 13a alongside the first position 10a of the track 10, a second staging region 13b alongside the second position 10b of the track 10, and one or more optional additional staging regions 13n alongside the track 10, as needed. It is to be appreciated that any of the staging regions can be located along either side of the track 10, as needed.

The track 10 and the staging regions 13a-n can be contained within a divider 6 or "fence", which can circumscribe an area in which the mobile robot 4 operates, which area can be referred to as a "robotic work cell" 7 or simply a "work cell" 7. The divider 6 can include one or more gates 8 for entry and exit of operators, such as other mobile robots and/or human operators, to and from the work cell 7. It is to be appreciated that items for picking or other sortation can enter and exit the work cell 7 through one or more additional openings in the divider. Additionally or alternatively, items can enter and exit the work cell 7 via mechanical conveyance that extends above the divider and into the work cell 7 and/or through an opening in a floor 9 of the work cell 7.

In one non-limiting example, the robot 4 can be a Fanuc Series R2000/125L six-axis robot manufactured by Fanuc America Corporation of Rochester Hills, Mich. It is to be appreciated, however, that other robots 4 can be employed with the carriage 60 described herein.

Figure 2A:
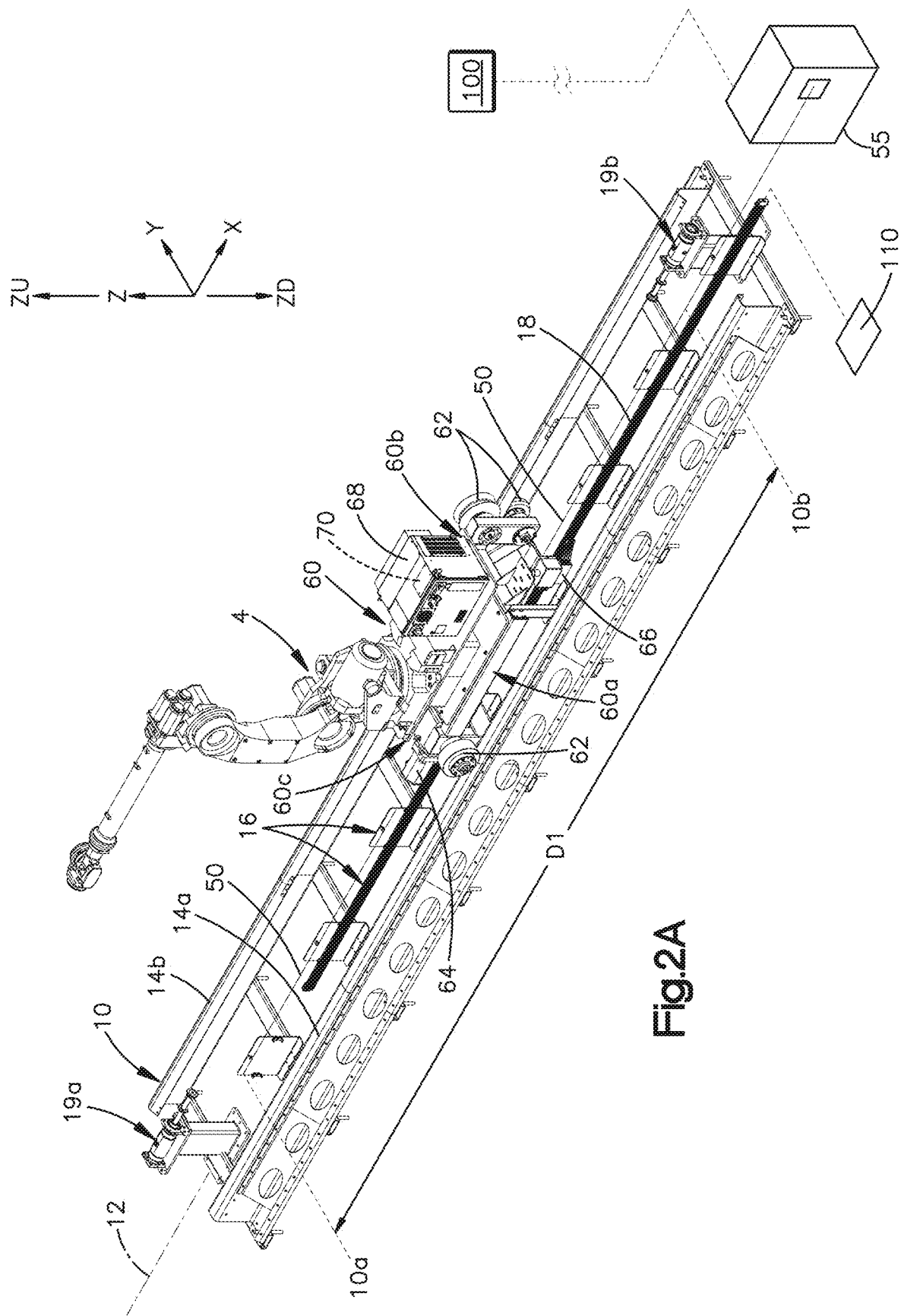
FIG. 2A shows an enlarged perspective view of a track and corresponding carriage of the mobile robot-on-rail system illustrated in FIG. 1.
Figure 2B:
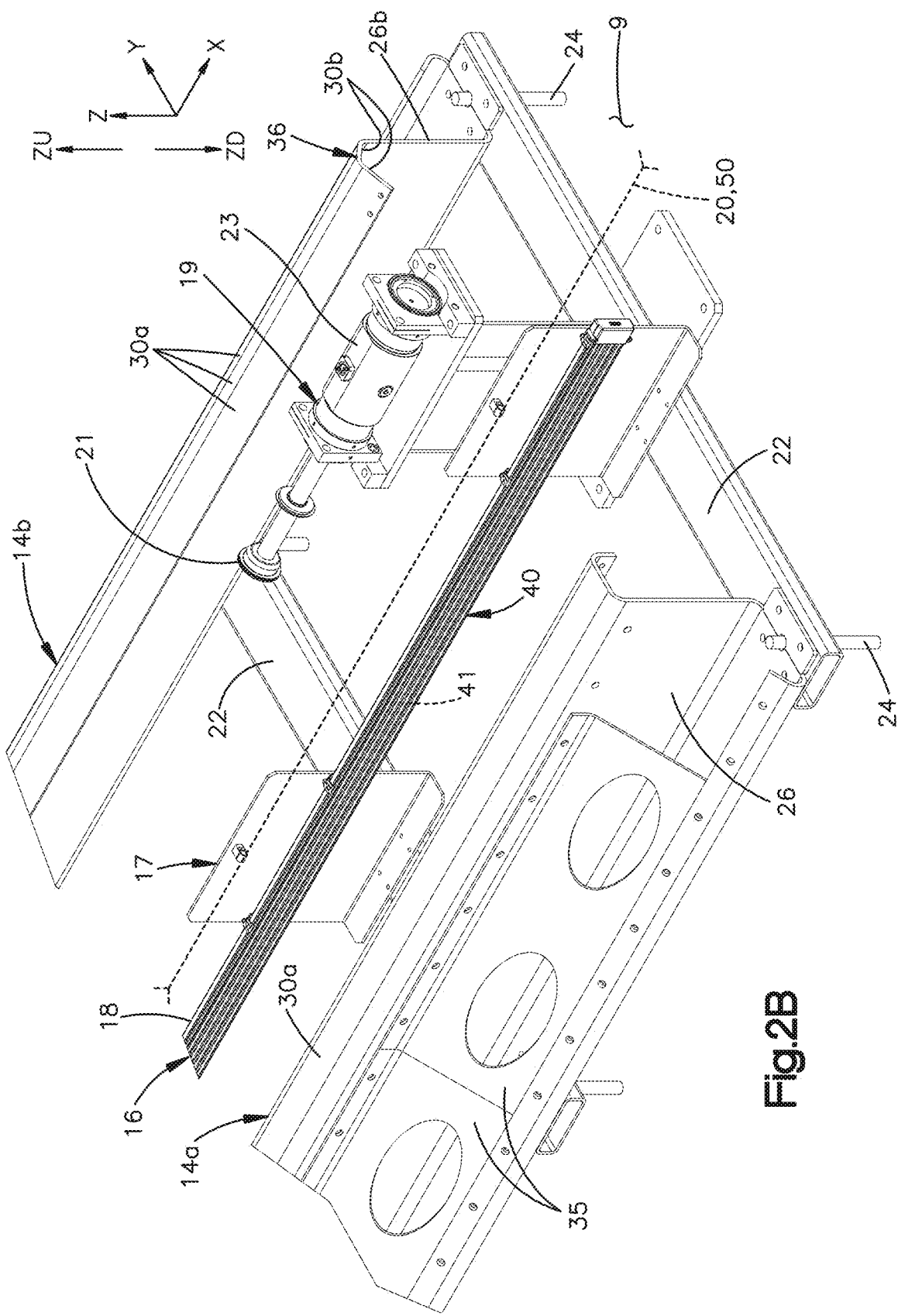
FIG. 2B shows a perspective view of a portion of the track illustrated in FIG. 1.

Referring now to FIGS. 2A through 2C, the track 10 includes a first rail 14a and a second rail 14b running parallel with each other and spaced from each other along the second direction Y. The first and second rails 14a, 14b can be referred to as "primary rails." The track 10 also includes an auxiliary linkage 16 extending along the axis 12 and positioned intermediate the first and second rails 14a, 14b. The auxiliary linkage 16 includes supporting components for supplying power and data transmission to the carriage 60. As used herein, the term "data" means "electronic information." For example, the power supply and data transmission of the auxiliary linkage 16 can be provided by a power transmitter 18 and a communication device 20, respectively. The power transmitter 18 and the communication device 20 can each be elongate along the first direction X and thus parallel with the axis 12. The auxiliary linkage 16 can also be referred to as an "auxiliary rail" or "third rail" 16. It is to be appreciated that in the illustrated embodiments, the power transmitter 18 and the communication device 20 are each stationary elements of the mobile robot system 2

The track 10 can also include a first end-stop 19a and a second end stop 19b adjacent the first and second track ends 11a, 11b, respectively. Each end stop 19a, 19b can include a fixed member 21 and a contact member 23 configured to abut a portion of the carriage 60 and move relative to the fixed member 21 in a manner arresting momentum of the carriage 60 should the carriage 60 abut the contact member 23. In the illustrated embodiment, the fixed member 21 is a cylinder and the fixed member 23 is a piston configured to translate against a compliant element within the cylinder, such as a spring or a dissipative fluid, such as a hydraulic or pneumatic fluid, by way of non-limiting examples. It is to be appreciated that other end stop configurations are within the scope of the present disclosure. Additionally, although the end stops 19a, 19b are shown as being positioned between the first and second rails 14a, 14b, the end stops 19a, 19b can optionally be located outside the rails 14a, 14b in other embodiments. A travel distance D1 provided by the track 10 can be measured between the contact members 23 along the first direction X. The travel distance D1 can be any distance as necessary for an item moving process in a warehouse, such as less than 1 ft., from 1 ft. to 10 ft., from 10 ft. to 25 ft., from 25 ft. to 50 ft., from 50 ft. to 100 ft., or greater than 100 ft., as needed. It is to be appreciated that the embodiments disclosed herein can be employed to provide a track 10 of virtually any length within a warehouse.

With reference to FIG. 2A, the carriage 60 includes a plurality of wheels 62 configured to travel along the rails 14a, 14b. In particular, the carriage 60 has a first side 60a and a second side 60b spaced from each other along the second direction Y, such that the first side 60a is configured to be proximate the first rail 14a and remote from the second rail 14b, while the second side 60b is configured to be proximate the second rail 14a and remote from the first rail 14b. Each of the first and second sides 60a, 60b of the carriage 60 has one or more wheels 62 extending therefrom and configured to run along the respective rail 14a, 14b. The carriage 60 also has a first end 60c and a second end 60d spaced from each other along the axis 12.

The carriage 60 also includes a drive assembly 64 configured to drive at least one of the wheels 62 along its respective rail 14a, 14b, and a carriage power assembly 66 configured to communicate power from the power transmitter 18 to the drive assembly 64. The carriage 60 also includes a carriage control module 68 (which can also be referred to as a "robot controller unit" or simply a "controller") that houses a processor 70 configured to receive data from a system control unit 100. Such data can include robot control data for controlling operation of the robot 4, such as for picking items, as well as carriage control data for controlling movement of the carriage 60 along the track 10, such as for positioning the robot 4 adjacent selective staging regions 13a, 13b, 13n. In particular, the carriage control module 68 is preferably in electronic communication with a carriage transceiver 72 that is positioned on the carriage 60 and is configured to receive and send data through the communication device 20 of the auxiliary rail 16, which is in electronic communication with the system control unit 100. It is to be appreciated that the system control unit 100 is preferably integrated within a warehouse control system for governing large-scale operations within the warehouse, such as inventory, picking, routing/conveying, sorting, packaging, and/or staging of items within the warehouse.

With reference to FIGS. 2B and 2C, the first and second rails 14a, 14b and the auxiliary rail 16 can be supported by a series of support members 22 anchored to the floor 9 by a plurality of anchors 24. Alternatively, the rails 14a, 14b, and 16 can be anchored directly to the floor 9. The support members 22 can be cross-beams (also referred to as "sleepers") elongate along the second direction Y. The support members 22 are preferably attached to each anchor 24 at an adjustable distance Z1 along the vertical direction Z. In this manner, distance Z1 for each support member 22 along the track 10 can be uniform, allowing each support member 22 to be elevated above the floor 9 at a uniform distance, which can enhance the stability of the track 10 and the carriage 60 during operation. In such embodiments, the support members 22 can be referred to as "support standards" or simply "standards." Such embodiments are preferred for effectively insulating the rails 14a, 14b, 16 from uneven or worn portions of the floor 9, and/or as a more direct means of verifying and adjusting the elevation of the support members 22 as necessary over the operational life of the system 2.

Each of the first and second rails 14a, 14b can comprise a series of respective rail segments 26a, 26b coupled in succession along the first direction X. Each of the first and second rails 14a, 14b includes a running portion 30 along which the wheels travel 62, a mount portion 32 configured to be anchored to the support members 22 (or alternatively directly to the floor 9), and an extension portion 34 extending between the running portion 30 and the mounting portion 32. It is to be appreciated that the running portion 30 can also be referred to as a "head" 30 of the respective rail 14a, 14b; the mounting portion 32 can also be referred to as a "foot" 32 of the respective rail 14a, 14b; and the extension portion 34 can also be referred to as a "web" 34 of the respective rail 14a, 14b. One or more an up to all of the rail segments 26a, 26b can be a monolithic member that defines its respective head 30, foot 32, and web 34. In such embodiments, the head 30, foot 32, and web 34 can be formed in the monolithic rail segment 26a, 26b by one or more mechanical bending processes, such as in a bending machine using dies to bend the rail segment 26a, 26b to its desired shape. Alternatively, one or more of the head 30, foot 32, and web 34 of a respective rail segment 26a, 26b can be a separate member fastened to one or more of the other members 30, 32, 34 of the respective rail segment 26a, 26b. In yet other embodiments, one or both of the rails 14a, 14b can be defined by a single-piece member that defines the head 30, foot 32, and web 34 of the respective rail 14a, 14b and extends continuously from the first end 11a to the second end 11b of the track 10.

The head 30 of each rail 14a, 14b defines a primary surface 30a configured for primary, load-bearing wheels 62a of the carriage 60 to travel along, as well as a secondary surface 30b configured for secondary, or "upstop" wheels 62b of the carriage 60 to travel along. The primary surfaces 30a generally face upward with respect to the vertical direction Z, and the secondary surfaces 30b generally face downward with respect to the vertical direction Z. The primary surfaces 30a are configured to oppose and thus support against and primary loads imparted by the carriage 60 and the robot 4 mounted thereon, which primary loads include the weight of the carriage 60 and the robot 4 mounted thereon. The secondary surfaces 30b are configured to oppose and thus support against and secondary loads imparted by the carriage 60 and the robot 4 mounted thereon, which secondary loads include bending moment forces having directional components in the upward vertical direction ZU, which forces can cause the carriage 60 (with the robot 4 mounted thereon) to tip or otherwise disengage from the rails 14a, 14b. These secondary surfaces 30b and thus important for the functionality of the system 2, as a robot 4 with a heavy, long arm articulating about the carriage in the second direction Y can otherwise cause the carriage 60 to tip or disengage from the rails 14a, 14b.

One or both of the primary rails 14a, 14b can also include one or more buttress members 35 configured to reinforce the rail 14a, 14b against operational forces applied from the carriage 60 to the primary rails 14a, 14b, particularly against bending moment forces measured along the second direction Y. Each buttress member 35 can be configured to provide support to the respective rail 14a, 14b along the second direction Y. In the illustrated embodiment, each buttress member 35 can extend from the foot 32 to the head 30 (or to a location of the web 34 adjacent the head 30) of the rail 14a, 14b. The one or more buttress members 35 can include a plurality of buttress members 35 affixed to the rails sequentially along the track 10, or can optionally include a single, monolithic member 35 extending between the first and second ends 11a, 11b of the track 10. The one or more buttress members 35 can include cutouts for reducing the overall weight of the one or more buttress members 35, as well as for conserving the material of the buttress member(s) 35.

The head 30 of at least one of the first and second rails 14b includes a guide member 36 for directing motion of the primary and/or secondary wheels 62a, 62b along the respective side 60a, 60b of the carriage 60 along the first direction X. As shown in the illustrated example, the head 30 of the first rail 14a can define substantially flat primary and secondary surfaces 30a, 30b, while the head 30 of the second rail 14b, and thus also the primary and secondary surfaces 30a, 30b thereof, can define the guide member 36, which in the present example has an inverted V-shape, as viewed in a sectional plane oriented orthogonal to the axis 12. The guide member 36 can be formed by bending the head 30 of the second rail 14b into the inverted V-shape, although other methods of providing the shape of the guide member 36 are within the scope of the present disclosure. The wheels 62 at the side 60a, 60b of the carriage 60 corresponding to the guide member 36 (i.e., the second side 60b in the illustrated embodiment) can have geometries complimentary with the guide member 36, as described in more detail below.

With reference to FIG. 2C, the track 10 can define a gauge width W (also referred to simply as the "gauge" W), measured between respective innermost points 38a, 38b of the first and second rails 14a, 14b along the second direction Y. In some embodiments, the gauge W can be in a range from 12 inches to about 48 inches. Additionally, each rail 14a, 14b can have a thickness T in a range of about 0.125 inches to about 0.75 inches, by way of non-limiting example. The thickness T is preferably substantially equivalent for the first and second rails 14a, 14b. The thickness T can be measured at the head 30, and can be substantially equivalent at the web 34 and/or the foot 32 of each rail 14a, 14b as well. Alternatively, the thickness can vary between the head 30 and the web 34 and/or the foot 32 of each rail 14a, 14b. It is to be appreciated that the foregoing dimensions of the rails 14a, 14b can be scaled upward or downward in size as necessary.

As shown in FIGS. 2B and 2C, the auxiliary rail 16 can include a plurality of mounts, such as brackets 17, which can be L-shaped and have a first portion 17a for anchoring to one of the support members 22 (or alternatively for anchoring directly to the floor 9) and a second portion 17b at a right angle to the first portion 17a. The second portion 17b of each bracket 17 can carry the power transmitter 18 and the communication device 20. It is to be appreciated that, in other embodiments, the power transmitter 18 and the communication device 20 can be carried by different auxiliary linkages or members.

The power transmitter 18 of the auxiliary rail 16 is preferably configured for power transmission to the carriage 60 via translational or "sliding" contact or engagement between the power transmitter 18 and electrical contacts of the carriage power assembly 66. In the illustrated embodiment, the power transmitter 18 is a bus bar 40 extending along the auxiliary rail 16. The bus bar 40 has at least one conductive strip of material 41 configured to conduct current to the carriage 60.

Figure 3:
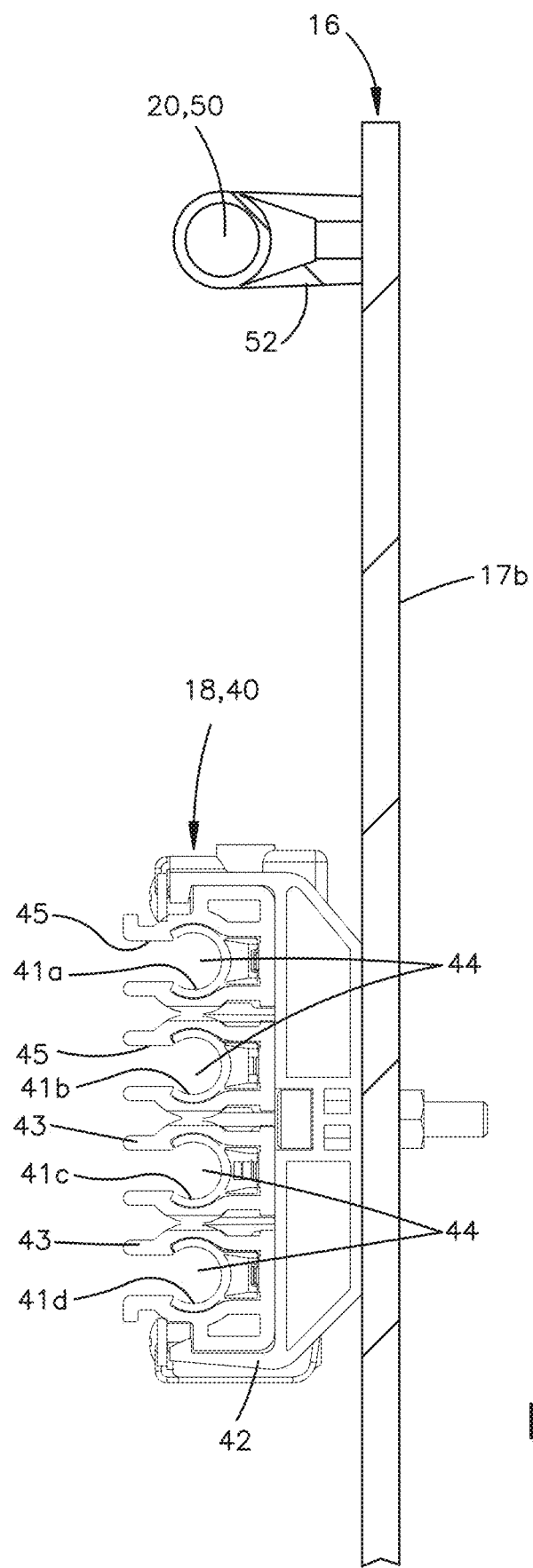
FIG. 3 shows a magnified sectional end view of a portion of an auxiliary link of the track illustrated in FIG. 2C.
Figure 4A:
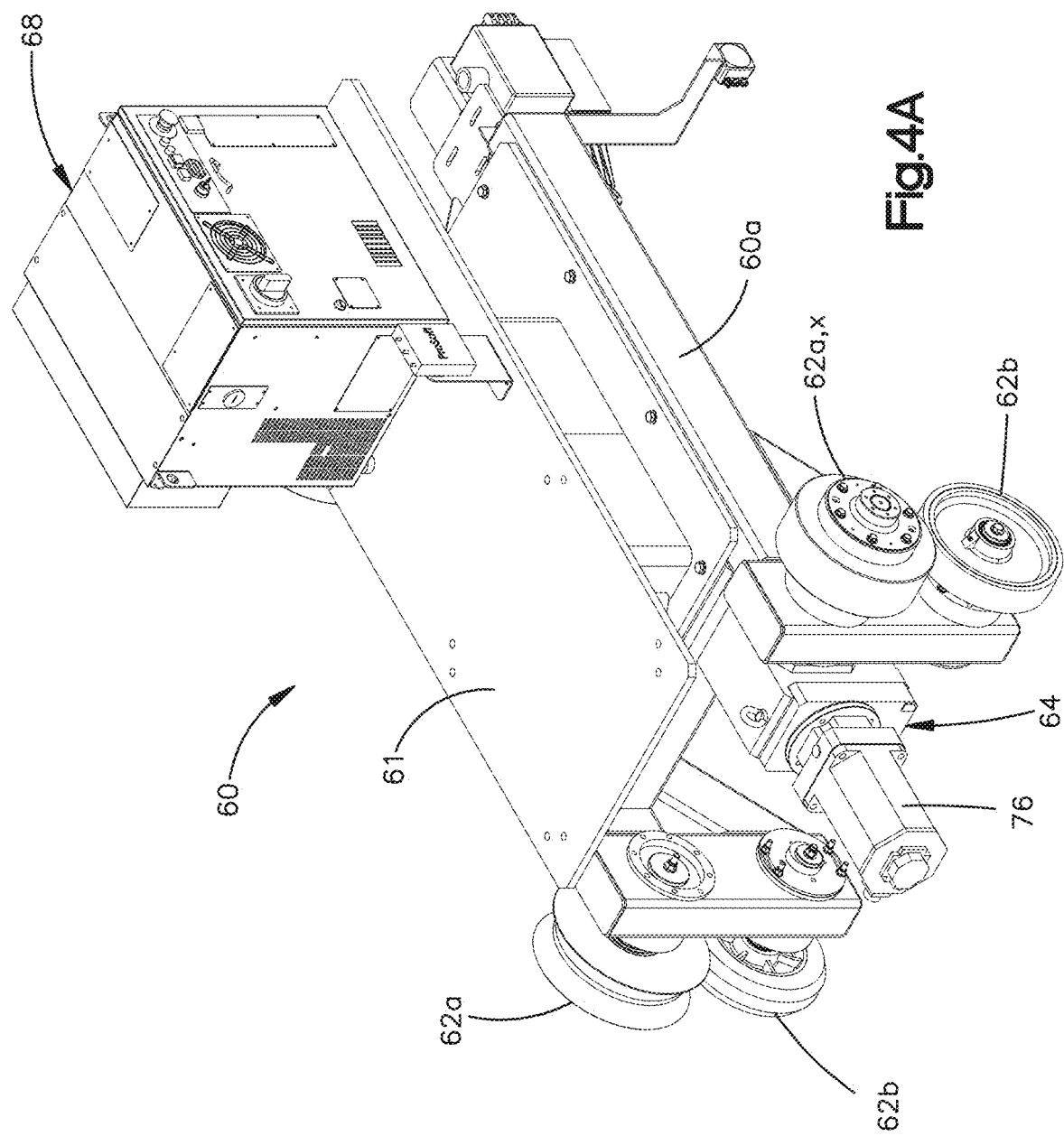
FIG. 4A shows a perspective view of a carriage of the mobile robot-on-rail system illustrated in FIG. 1, displaying a first side of the carriage, wherein the robot is removed for illustrative purposes.
Figure 4C:
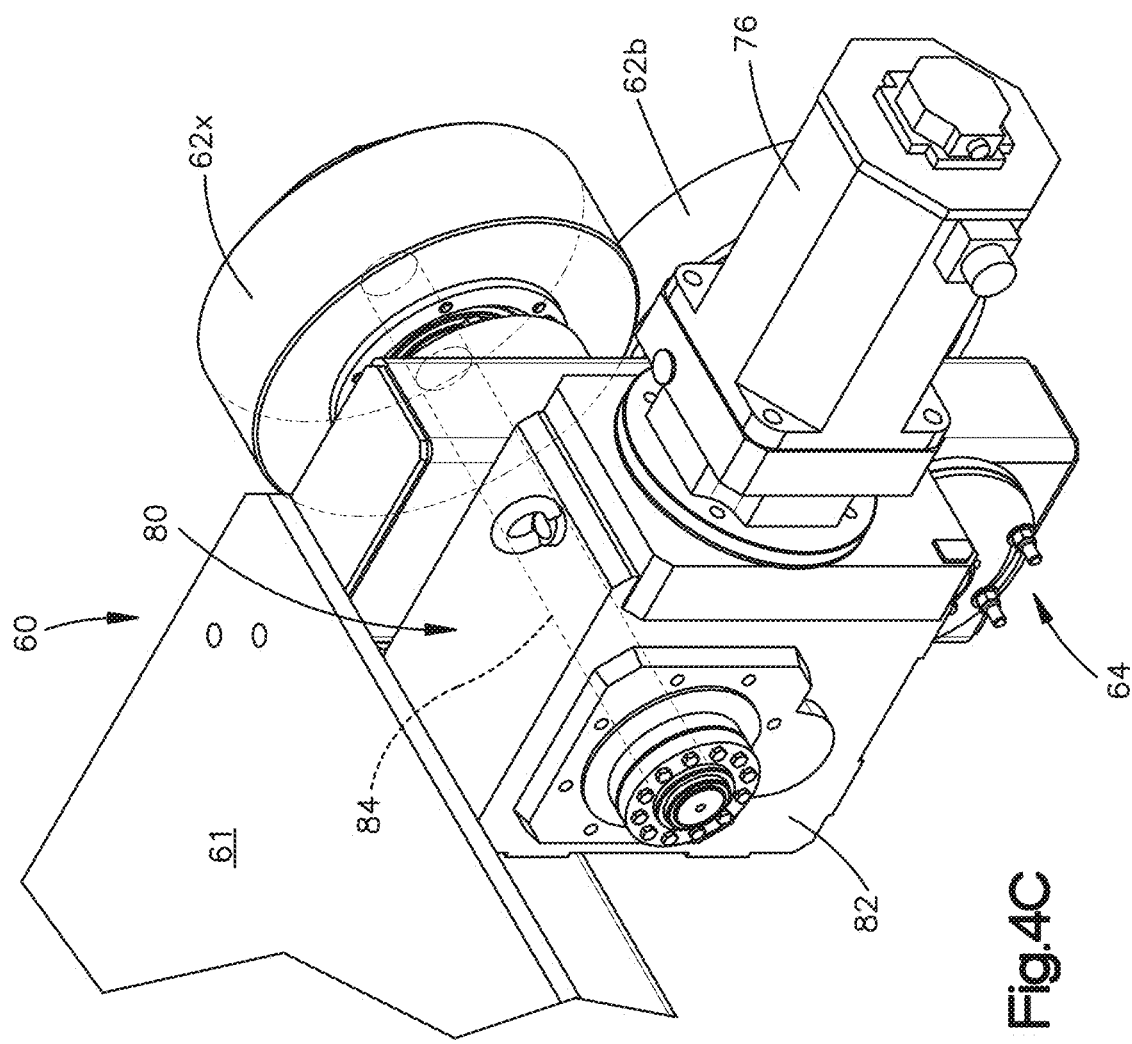
FIG. 4C is a perspective view of a drive assembly of the carriage illustrated in FIG. 4A.
Figure 4D:
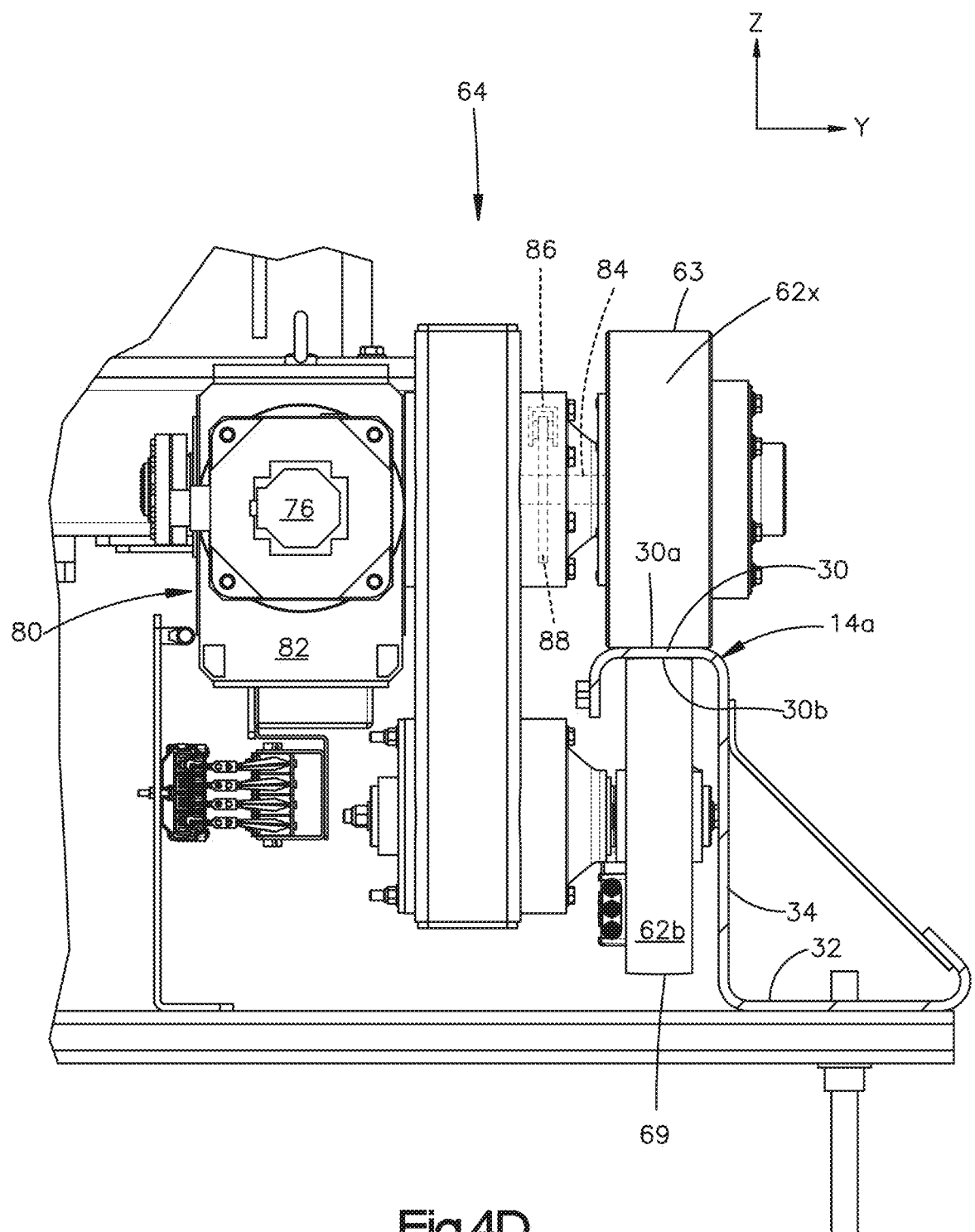
FIG. 4D is an end plan view of the drive assembly illustrated in FIG. 4C, shown coupled to a rail of the track.

Referring now to FIG. 3, the bus bar 40 preferably has a plurality of conductive strips of material 41a-d (also referred to herein as "conductive strips" 41a-d), such as copper or another conductive material, extending along the first direction X between the first and second ends 11a, 11b of the track 10. The conductive strips 41a-d are configured for sliding engagement with contacts of the carriage power assembly 66, as described in more detail below. The bus bar 40 can include a housing 42 that is attached to the second portions 17b of the brackets 17 along the track 10 and houses the conductive strips 41a-d. One or more and preferably all of the conductive strips 41a-d resides in an interior space 44 defined by an insulative (i.e., non-conductive) support member 43, which can also define an opening 45 in communication with the interior space 44. Preferably, the openings 45 of the bus bar 40 are slightly narrower than the respective interior spaces 44, which can protect against inadvertent physical contact and electrical conduction between the conductive strips 41a-d and elements of the system exterior of the bus bar 40. It is to be appreciated that the insulative support members 43 can also be compliant in at least one direction, and preferably in multiple directions, so as to bias the conductive strips 41a-d against the associated contact members of the carriage 60 as the carriage 60 travels along the track 10. Such compliance can also accommodate slight variations in the travel of the contact members, such as variations caused by bumps or other travel anomalies experienced by the carriage 60, without causing damage to the bus bar 40 or the contact members.

Additionally, the communication device 20 carried by the auxiliary rail 16 is configured for data transmission to and from the carriage 60 without communication wires physically tethering the carriage 60 to any portion of the system remote from the carriage 60 and robot 4, such as to the track 10. In the illustrated embodiment, the communication device 20 is a radiating cable 50 attached to cable mounts 52 on the second portions 17b of the brackets 17 of the auxiliary rail 16. The radiating cable 50 is preferably a co-axial cable 50 having an outer conductor that has gaps or slots defined therein, which gaps or slots allow for electronic signal, such as radio waves, to transmit into and out of the cable 50 along its length (as opposed to the electronic signal transmitting into and out of the cable 50 solely at one or more of its end nodes). Such radiating cables 50 are also referred to in other arts, such as subterranean mining arts, as "leaky feeder"; "leaky coaxial cable"; or "leaky coax".

Referring again to FIG. 2A, the radiating cable 50 is electronically connected to a communication control unit 55 that is configured to transmit electronic information through the radiating cable 50 to the carriage control module 68. The communication control unit 55 can also be referred to as an "access point" of the radiating cable 50. As with the radiating cable 50, the communication control unit 55 is a stationary element of the mobile robot system 2. The communication control unit 55 includes a signal generator for transmitting electronic signals through the radiating cable 50. In particular, the communication control unit 55 can include a radio frequency (RF) signal generator for transmitting radio waves through the radiating cable 50 to be received by the carriage transceiver 72, which in this embodiment is a radio antenna. The carriage transceiver 72 then transmits the electronic information in the radio waves to the carriage control module 68. It is to be appreciated that the carriage transceiver 72 is also configured to send electronic information, such as in the form of radio waves, from the carriage control module 68, through the radiating cable 50, and to the communication control unit 55, which is configured to interpret the electronic information received from the carriage transceiver 72. Thus, the communication control unit 55 and the carriage control module 68 are each configured for two-way communication with each other via the radiating cable 50. Thus, the communication control unit 55 can also be characterized as a transceiver. The inventors are not aware of any radiating cables 50 or such systems employed for use with prior art mobile robots, particularly track/rail mobile robots, in a fulfilment center.

The radiating cable 50 can be configured to operate at various frequencies, as desired. For example, the radiating cable 50 can be configured to operate at Wi-Fi frequencies, such as frequencies within the 2.4 GHz band (i.e., in a range from 2.4 GHz to 2.5 GHz) and/or within the 5 GHz band (i.e., in a range from 5.0 GHz to 5.9 GHz). Moreover, the radiating cable 50 can be configured to operate at any channel within the 2.4 GHz band or the 5 GHz band, including channel hopping within these bands. In other embodiments, the radiating cable 50 can be configured to operate at cellular frequencies, such as the 800 MHz band and/or the 1900 MHz band, for example. In yet other embodiments, the radiating cable 50 can be configured to operate at Zigbee frequencies. It is to be appreciated that the foregoing frequencies are provided as non-limiting examples of the frequencies at which the radiating cable 50 can be configured to operate, and other frequencies of operation are within the scope of the present disclosure.

The radiating cable 50 configured as described herein can provide the system 2 with sufficient wireless data transmission speeds and bandwidths between the track 10 and the carriage 60, even at the maximum carriage 60 speeds envisioned for the present embodiments, to provide the carriage 60, and the robot 4 mounted thereon, with precise motion control for picking and/or otherwise moving items between locations alongside the track 10, such as the staging regions 13a, 13b, 13n.

It is also to be appreciated that in other embodiments, one or both of the carriage 60 and the robot 4 can communicate with the system control unit 100 via wireless data transmission, such as Wi-Fi, wireless local area network (WLAN), and/or wireless radio transmissions, by way of non-limiting examples.

Referring now to FIGS. 4A through 5C, the carriage 60 is shown without the robot 4 mounted thereon for illustrative purposes. The carriage 60 includes a mounting feature, such as a mounting platform 61, on which the robot 4 can be mounted. As described above, each of the first and second sides 60a, 60b of the carriage 60 has one or more wheels 62 extending therefrom. The wheels 62 include the primary wheels 62a configured to travel along the primary surfaces 30a of the rails 14a, 14b, and the upstop wheels 62b configured to travel along the secondary surfaces 30b of the rails 14a, 14b. In the illustrated embodiment, a single pair of wheels 62, including a primary wheel 62a and an upstop wheel 62b, extends from the first side 60a of the carriage 60 and is configured to travel along the first rail 14a, while two pairs of wheels 62, each such pair including a primary and upstop wheel 62a, 62b, extend from the second side 60b of the carriage 60 and are configured to travel along the second rail 14b. It should be appreciated, however, that other wheel pairings and configurations are within the scope of the present disclosure. The wheels 62 can be constructed of a material configured to satisfactorily grip the rails 14a, 14b for rapid starting and stopping. Such a wheel material can include a urethane, such as polyurethane, although other wheel materials are within the scope of the present disclosure.

With reference to FIGS. 4A through 4D, in the illustrated embodiment, the primary wheel 62a on the first side 60a of the carriage 60 is a drive wheel 62x, and is thus operatively coupled to the drive assembly 64 of the carriage 60. The drive assembly 64 includes a motor 76 having a rotor operatively coupled to the drive wheel 60x. The motor 76 is preferably a servo motor configured to precisely control the rotation and angular position of the rotor. In one non-limiting example, the servo motor can be a Fanuc Single Alpha iS (αiS) Series (400V) servo motor manufactured by Fanuc America Corporation. It is to be appreciated, however, that other servo motors 76 can be employed with the embodiments of the present disclosure.

The drive assembly 64 preferably includes a drive transmission 80 that includes a plurality of gears intermeshed with each other and located in a gearbox 82. The gears include an input gear coupled to the rotor, and an output gear coupled to the drive wheel 62x. The gears of the drive transmission 80 can include a low-backlash gear unit, such as a type produced by Stober Drives, Inc. of Maysville, Ky., by way of a non-limiting example. The output gear can be coupled to an axle 84 that is coupled to the drive wheel 62x.

The axle 84 can have a plurality of splines configured to engage an output gear of the drive transmission 80. In other embodiments, the output gear of the drive transmission 80 can be coupled directly to the drive wheel 62x. The motor 76 and the drive transmission 80 are configured to cooperatively and swiftly drive the carriage 60 (and thus the robot 4) along the track 10 with precise positional control along the axis 12.

The drive assembly 64 includes a position encoder, such as a rotary encoder, which is preferably an absolute position rotary encoder, that is configured to transmit rotational position data to the carriage control module 68. The rotary encoder can be coupled to the axle 84 or the drive wheel 62x to provide direct rotary position data of the drive wheel 62x. Alternatively, the rotary encoder can be coupled to one of the gears of the transmission 80, such as the input gear or the output gear, for example. The carriage control module 60 can utilize the rotational position data from the rotary encoder as master location indicia. The carriage control module 60 can also compare the rotational position data from the rotary encoder to rotational position data from a rotary encoder of the motor for validation.

In the illustrated embodiment, the drive wheel 62x is located at the first side 60a of the carriage 60 and has a running surface 63 with a flat profile, as viewed in a sectional plane oriented orthogonal to the axis 12, which flat profile is configured to roll along the primary surface 30a of the first rail 14a. Additionally, the drive wheel 62x is paired with an upstop wheel 62b located below the drive wheel 62x and having a flat profile configured to roll along the secondary surface 30b of the first rail 14a. The drive wheel 62x and its paired upstop wheel 62b are located at the first end 60c of the carriage 60 in the illustrated embodiment, although they can be alternatively located at other locations along the carriage 60.

Figure 5B:
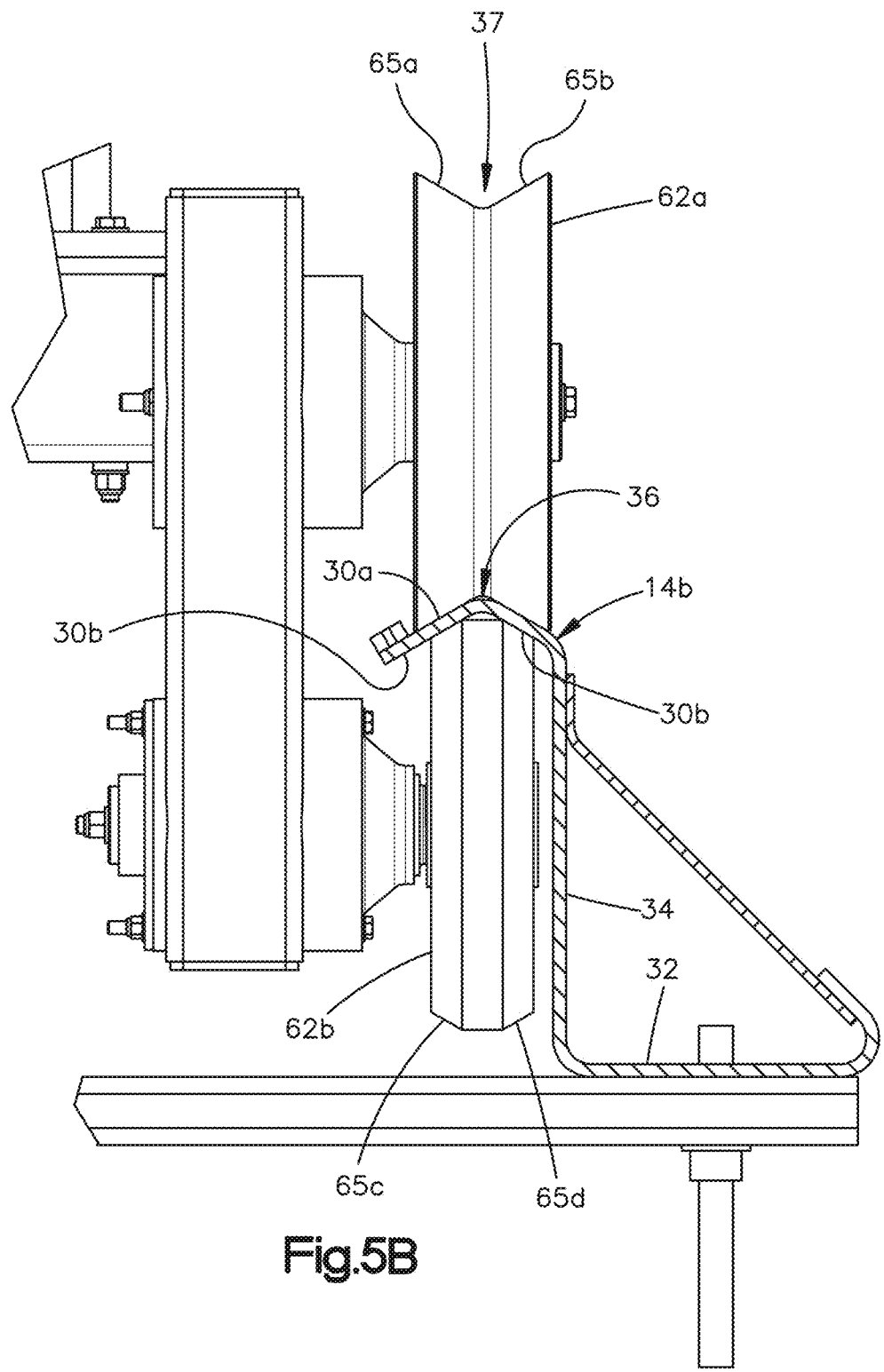
FIG. 5B is an end plan view of a pair of wheels extending from the second side of the carriage and engaged with a guide member of the track, according to an embodiment of the present disclosure.

Referring now to FIGS. 5A and 5B, as mentioned above, two pairs of wheels 62, each such pair including a primary and upstop wheel 62a, 62b, can extend from the second side 60b of the carriage 60 and are configured to travel along the second rail 14b. The primary and upstop wheels 62a, 62b on the second side 60b of the carriage 60 can each define a V-shaped profile complimentary with the V-shaped guide member 36 of the head 30 of the second rail 14b. In particular, each primary wheel 62a on the second side 60b has running surface 63 that defines a groove or channel 37 that defines angled support surfaces 65a, 65b, which provide these primary wheels 62a with an inverted V-shaped profile, as viewed in a sectional plane oriented orthogonal to the axis 12, which profile is complimentary with the inverted V-shaped profile of the primary surface 30a of the second rail 14b. Thus, the inverted V-shaped profiles of the primary wheels 62a on the second side 60b can be characterized as "female" guide features, while the inverted V-shaped profile of the primary surface 30a of the second rail 14b can be characterized as a complimentary "male" guide member 36. Additionally, each upstop wheel 62b on the second side 60b has beveled, chamfered, or otherwise canted support surfaces 65c, 65d that provide these upstop wheels 62b with an apexed profile, such as an inverted V-shaped profile in the sectional plane, which profile is complimentary with the inverted V-shaped profile of the secondary surface 30b of the second rail 14b. The inverted V-shaped profiles of the upstop wheels 62b on the second side 60b can be characterized as male guide features, while the inverted V-shaped profile of the secondary surface 30b of the second rail 14b can be characterized as a complementary female guide member 36. The guide member 36 and the complimentarily shaped primary wheels 62a and upstop wheels 62b on the second side 60b of the carriage 60 are configured to maintain the relative position, with respect to the second direction Y, of the wheels 62 on the second side of the carriage 60 and the second rail 14b, thereby guiding the carriage 60 as it travels along the rails 14a, 14b. Additionally, the angles at which the primary and secondary surfaces 30a, 30b of the second rail 14 and the associated support surfaces 65a-d of the associated wheels 62 are oriented enhance the alignment of reactionary support forces imparted by the surfaces 30a, 30b of the second rail 14b that resist the bending moment forces imparted by the robot 4 to the second rail 14b through the support surfaces 65a-d of the wheels 62 on the second side 60b of the carriage 60.

It is to be appreciated that the particular configurations of the wheels 62 described above, including the respective shapes, locations, and pairings of the primary and secondary wheels 62a, 62b at both the first and second sides 60a, 60b of the carriage 60 (as well as the drive wheel 62x), represent one example wheel configuration of the carriage 60, while other wheel configurations are within the scope of the present disclosure. For example, the carriage 60 can include multiple drive wheels 62x, which can be located on the same side 60a, 60b or at different sides 60a, 60b of the carriage 60. Moreover, the primary wheels 62a and upstop wheels 62b need not be located in pairs, and can be located or otherwise distributed along the carriage 60 as desired.

One or more and preferably all of the upstop wheels 62b, including those on both the first and second sides 60a, 60b of the carriage 60, can be biased or "pre-loaded" against the respective secondary surface 30b of the first and second rails 14a, 14b. In this manner, the upstop wheels 62b can maintain engagement with the heads 30 of the rails 14a, 14b, enhancing the stability of the carriage 60 one the track 10. FIG. 5C shows an example of such a biasing element that pre-loads the upstop wheel 62b against the secondary surface 30b of the respective rail 14a, 14b. As shown, the upstop wheel 62b can be coupled to the carriage 60 via an eccentric pin 67 that is torqued or otherwise rotated and affixed in a manner biasing the upstop wheel 62b against the secondary surface 30b of the associated rail 14a, 14b. Each of the upstop wheels 62b can be pre-loaded in this manner. It is to be appreciated that other means for biasing the upstop wheels 62b against the secondary surfaces 30b of the rails 14a, 14b are within the scope of the present disclosure.

Referring now to FIGS. 5C and 6, the carriage power assembly 66 includes a power collector 90 that has one or more electrical contacts 91 in translational or sliding electrical engagement with the power transmitter 18. Thus, the engagement between the power transmitter 18 and the power collector 90 can be characterized as a stationary-to-mobile power coupling. The power collector 90 can be carried by a mounting feature, such as a bracket 95, that positions the power collector 90 underneath the carriage 60 and adjacent the power transmitter 18. The power collector 90 preferably includes a plurality of electrical contacts 91a-d (also referred to as "current collectors") each in sliding engagement with a respective one of the conductive strips 41a-d of the bus bar 40. The electrical contacts 91a-d can be carried by a plurality of collector arms 92 extending from a collector hub 93. In particular, a first end 92a of each collector arm 92 can be coupled to the hub 93, while a second end 92b of each collector arm 92 can be coupled to a contact mount 94 that carries the respective electrical contact 91a-d. The collector arms 92 can position the electrical contacts 91a-d in sliding engagement with the associated conductive strips 41a-d. For example, the collector arms 92 and mounts 94 can position the electrical contacts 91a-d through the openings 45 and into the interior spaces 44 of the bus bar 40 so that the electrical contacts 91a-d are maintained in sliding engagement with the conductive strips 41a-d. The collector arms 92 and mounts 94 are preferably made of electrically insulative material. The mounts 94 can define tube ports or apertures 96 for receiving insulative tubing that houses wires providing electrical communication from each electrical contact 91a-d to circuitry contained in a housing 99 of the carriage power assembly 66. The circuitry is configured for, among other things, accumulating the electrical current collected by the electrical contacts 91a-d and transmitting the electrical current to the motor 76 and/or the carriage control module 68. It is to be appreciated that the mounts 94 can be spring-loaded to the collector arms 92 or otherwise configured to bias the sliding contacts 91a-d into engagement with the conductive strips 41a-d.

Additionally, as shown, the power collector 90 can include a pair of collector arms 92, each carrying an electrical contact 91, for each of the conductive strips 41a-d. The collector arms 92 of each pair can extend from opposite ends of the hub 93 with respect to the first direction X. In this manner, at least one of the collector arms 92 of each pair is towed during movement of the carriage 60 along the track 10. In the illustrated embodiments, the power collector 90 includes four collector arms 92 extending from one end of the hub 93 and each carrying an electrical contact 91a-d configured to engage a respective one of the conductive strips 41a-d, as well as an additional four collector arms 92 extending from the other end of the hub 93 and each carrying an electrical contact 91a-d configured to engage a respective one of the conductive strips 41a-d. In this manner, the power collector 90 can be characterized as a "dual" power collector because two electrical contacts 91 are in sliding engagement with each of the conductive strips 41a-d. It is to be appreciated, however, that a "single" power collector 90 configuration can be employed having a single collector arm 92 for each of the respective conductive strips 41a-d. In such an embodiment for employment with the bus bar 40 shown, the power collector 90 would have a total of four collector arms 92, each carrying an electrical contact 91 for sliding engagement with a respective one of the conductive strips 41a-d. It is further to be appreciated that other configurations for the power collector 90 can be employed for providing sliding engagement between the carriage power assembly 66 and the power transmitter 18.

It is also to be appreciated that other modes of powering the carriage 60 and the robot 4 can be employed that need not employ cables that physically tether the carriage 60 or robot 4 to a fixed location. By way of non-limiting examples, such other power modes can include inductive power transfer (IPT) and/or capacitive power transfer (CPT) between the track 10 and the carriage 60, and/or one or more rechargeable batteries located on the carriage 60.

As described above, the carriage 60 includes a transceiver 72, such as a radio antenna, configured to receive and send data, such as via radio waves, from and to the radiating cable 50. The carriage transceiver 72 is in electronic communication with the carriage control module 68, whereby the processor 70 can interpret the data communicated through the radiating cable 50, such as the robot control data and the carriage control data, and control movement of the robot 4 and the carriage 60 accordingly. The carriage transceiver 72 is preferably positioned on the carriage 60 at a location that is maintained in close proximity to the radiating cable 50 as the carriage 60 moves along the track 10. The carriage transceiver 72 can optionally be in electronic communication with the carriage control module 68 via the circuitry in the housing 99 of the carriage power assembly 66. It is to be appreciated that instead of a single carriage control module 68 that controls operation of the robot 4 and movement of the carriage 60, the carriage 60 can employ separate control modules, such as a robot control module for controlling the robot 4 and a carriage control module for controlling movement of the carriage 60 along the track 10.

Referring again to FIG. 1A, example methods of operating the mobile robot system 2 will now be described. A plurality of items can be conveyed to a staging region adjacent the track 10, such as the first staging region 13a, for example. The system control unit 100 can cause the carriage 60 to move the robot 4 to a location along the track 10 alongside or otherwise adjacent the first staging region 13a. As this location, the robot 4 can manipulate at least one of the items, such as by picking the at least one item. For example, the robot 4 can pick the at least one item and at the first staging region 13a and deposit the at least one item at an adjacent staging region 13n, which can be on the same side or the opposite side of the track 10. Alternatively, the robot 4 can pick the at least one item at the first staging region 13a and hold the at least one item for conveyance along the track 10 to another staging region, such as the second staging region 13b, for example. Thus, it can be said that the robot 4 can manipulate at least one item at one staging region, move along the track 10 to a location adjacent an additional staging location, and manipulate the at least one item or at least one other item at the additional staging region.

The example method includes moving the carriage along the track, thereby conveying the robot along the track 10 to various locations along the track 10 as needed, which locations can be alongside or otherwise adjacent any of the various staging regions 13a, 13b, 13n. For example, one or more of the staging regions 13a, 13b, 13n can be an incoming staging region, such as an output zone of a mechanical conveyor, for example, at which items are conveyed to the robot 4. Additionally, one or more of the staging regions 13a, 13b, 13n can be an outgoing staging region, such as an induction zone of a mechanical conveyor, for example, at which items are conveyed away from the robot 4 to downstream processes within the fulfilment center. Accordingly, the robot 4 can optionally pick incoming items from one or more incoming staging regions, travel along the track (via movement of the carriage 60) with the picked items to one or more outgoing staging regions, and deposit the items at the one or more outgoing staging regions, as controlled by the system control unit 100. It is to be appreciated that the robotic work cell 7 described herein provides a vast number of options for sorting items with the mobile robot system 2.

Each step of moving the carriage 60 along the track 10 can be completed utilizing the following sequence. The system control unit 100 can send a command signal to the communication control unit 55, which command signal can include carriage control data, such as updated location data, for positioning the carriage 60 (and thus also the robot 4) at a particular location along the axis 12 of the track 10. The signal generator of the communication control unit 55 can convert the carriage control data into the data transmission mode employed by the transmission device 20, such as radio waves, and transmits the radio waves through the radiating cable 50. The carriage transceiver 72 receives the radio waves transmitting the carriage control data, and then transmits the carriage control data to the control module 68. The processor 70 of the control module 68 interprets the carriage control data and sends drive command signals to the drive assembly 64 to drive the carriage 60 to the commanded location along the track 10 indicated in the carriage control data. The drive command signals can disengage the brake 86 of the drive wheel 62x and energize the motor 76 to rotate the drive wheel 62x, thereby driving the carriage 60 (and thus the robot 4) to the commanded location. The drive command signals preferably also engage the brake 86 when the carriage 60 arrives at the command location, thereby temporarily affixing the location of the carriage 60 and robot 4 while the robot 4 manipulates one or more items from the command location. The foregoing sequence can be repeated for each update to the location data sent by the system control unit 100.

Each step of moving the carriage 60 along the track 10 also includes supplying power to the motor 76. In the embodiments illustrated herein, the supplying step includes sliding at least one electrical contact 91 carried by the carriage 60 along at least one conductive strip 41 of the power transmitter 18 of the track 10. As described above, the at least one electrical contact 91 can be a plurality of electrical contacts 91a-d of the power collector 90, which electrical contacts 91a-d slide along a respective plurality of conductive strips 41a-d of the bus bar 40.

It is to be appreciated that operation of the mobile robot system 2 is not limited to the example methods and steps set forth above.

It is also to be appreciated that a mobile robot system as described herein can employ multiple robot-carrying carriages 60 using the same track 10. For example, the track 10 of a mobile robot system 2 can extend through multiple robot work cells 7, each such work cell 7 having its own carriage-mounted robot 4. In such embodiments, the system 2 can include a robot staging area along the track 10. At the beginning of a work period, the carriage-mounted robots 4 can travel along the track 10 from the robot staging area to their designated work cells 7. Such a system can also include one or more side tracks onto which the robots 4 can be diverted, such as when they may need maintenance or repair, without impeding travel of the other robots 4 on the track 10.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated. Also, the present invention is not intended to be limited by any description of drawbacks or problems with any prior art device.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A system for conveying a robot between a first and second location in a warehouse, the system comprising:
    a track extending along an axis, the track including:
        a pair of rails;
        a power transmitter configured to conduct electrical power; and
        a radiating cable configured to transmit electronic information to and from a control unit;
    a carriage configured to travel along the track along the axis, the carriage including:
        a plurality of wheels configured to roll along the pair of rails, wherein the plurality of wheels includes a drive wheel;
        a motor configured to drive the drive wheel so as to drive the carriage along the track between the first and second locations;
        a power collector in electrical communication with the motor, wherein the power collector is configured to translate along the power transmitter while maintaining contact with the power transmitter so as to conduct electrical power from the power transmitter to the motor; and
        a transceiver configured to receive and send electronic information from and to the radiating cable; and
    a robot arm mounted to the carriage, the robot arm configured to grip items.

2. The system of claim 1, wherein the robot arm is configured for six-axis movement independent of the carriage, and the carriage provides the robot arm with additional movement along the axis, whereby the robot arm is configured for seven-axis movement in total.

3. The system of claim 1, wherein the system includes a divider surrounding the track and the first and second locations in a manner defining a robot work cell.

4. A robot system, comprising:
    a track extending along an axis between a first location and a second location, the track including:
        a pair of rails; and
        a power transmitter and a radiating cable each extending along the track and each being stationary;
    a carriage configured to convey a robot arm along the track, the carriage including:
        a plurality of wheels configured to roll along the pair of rails;
        a motor configured to drive at least one of the wheels along one of the rails;
        a power collector configured to translate along the power transmitter while maintaining contact with the power transmitter so as to conduct electrical power from the power transmitter to the motor; and
        a transceiver configured to receive and send electronic information from and to the radiating cable.

5. The robot system of claim 4, wherein:
    the power transmitter is a bus bar having at least one strip of conductive material each extending along a direction of travel orientated along the axis; and
    the power collector includes at least one electrical contact configured to travel along the at least one strip of conductive material of the bus bar.

6. The robot system of claim 5, wherein the bus bar includes a housing, the at least one strip of conductive material includes three or more strips of conductive material each located in a respective interior space partially surrounded by insulative material carried by the housing, and the at least one electrical contact includes three or more sliding contacts configured to extend respectively within the respective interior spaces and maintain contact respectively with the three or more strips of conductive material as the carriage travels along the track.

7. The robot system of claim 6, wherein the bus bar and the radiating cable each extend along an auxiliary linkage located between the pair of rails and extending along the direction of travel, the power collector extends underneath the carriage and includes a hub and three or more arms that extend from the hub and carry the three or more sliding contacts, respectively.

8. The robot system of claim 4, wherein the radiating cable is configured to transmit radio waves, and the transceiver is a two-way radio antenna.

9. The robot system of claim 8, wherein the radiating cable is configured to transmit radio waves at a frequency in a range from 2.4 GHz to 2.5 GHz or from 5.0 GHz to 5.9 GHz.

10. The robot system of claim 4, wherein the motor is a servo motor.

11. The robot system of claim 4, wherein:
each rail of the pair of rails includes a first surface and an opposed second surface each configured to support a respective one of the plurality of wheels; and
the plurality of wheels includes load-bearing wheels and secondary wheels, wherein each of the load-bearing wheels is configured to travel along the first surface of the respective rail, and each of the secondary wheels is configured to travel along the second surface of the respective rail.

12. The robot system of claim 11, wherein the first and second surfaces of a first rail of the pair of rails are planar, and the first and second surfaces of a second rail of the pair of rails define an inverted V-shape in a plane orthogonal to the axis.

13. The robot system of claim 12, wherein the first and second rails are spaced from each other along a transverse direction perpendicular to the axis, and the first and second surfaces of each rail are spaced from each other along a third direction that is perpendicular to the axis and the transverse direction.

14. The robot system of claim 13, wherein the plurality of wheels includes at least three pairs of wheels each including a load-bearing wheel and a secondary wheel, the at least three pairs of wheels including a first pair of wheels on the first rail, and a second and third pair of wheels on the second rail, wherein the load-bearing wheel in each of the second and third pairs of wheels has a grooved running surface complimentary with the inverted V-shaped first surface of the second rail, and the secondary wheel in each of the second and third pairs of wheels has an apexed running surface complimentary with the inverted V-shaped second surface of the second rail.

15. The robot system of claim 11, wherein the at least one of the wheels is a drive wheel that is the load-bearing wheel of the first pair of wheels, the carriage includes a drive transmission connecting the motor to the drive wheel, and the drive transmission includes a gearbox.

16. The robot system of claim 11, wherein each secondary wheel is connected to a biasing element that biases the secondary wheel against the second surface of the respective rail.

17. A method of moving items within a warehouse, the method comprising:
manipulating at least one item at a first region with a robot arm fastened to a carriage coupled to a track;
transmitting electronic information to the carriage through a radiating cable extending along the track; and
moving the carriage along the track responsive to the electronic information so as to convey the robot arm to a second region remote from the first region, wherein the moving step comprises:
sliding at least one electrical contact carried by the carriage along at least one conductive strip that extends along the track, thereby conducting current from the at least one conducting strip to the at least electrical contact; and
conducting the current from the at least one electrical contact to a motor that drives the carriage along the track.

18. The method of claim 17, further comprising manipulating the at least one item or at least one other item at the second region with the robot arm.

19. The method of claim 17, wherein the transmitting step comprises:
transmitting electronic information including updated location data through the radiating cable;
receiving the electronic information via an antenna located on the carriage at a location proximate the radiating cable; and
communicating the updated location data from the antenna to a control module of the carriage.

20. The method of claim 19, wherein the moving step comprises, under command of the control module responsive to receipt of the updated location data:
disengaging a brake coupled to a drive wheel connected to the motor;
driving the drive wheel with the motor, thereby driving the carriage to the second region; and
braking the drive wheel after the carriage arrives at the second region.

\* \* \* \* \*